US010387347B2

(12) United States Patent
Chen

(10) Patent No.: US 10,387,347 B2
(45) Date of Patent: Aug. 20, 2019

(54) METHOD TO LOCATE SAS JBOD CABLE ROUTING

(71) Applicant: QUANTA COMPUTER INC., Taoyuan (TW)

(72) Inventor: Lien-Hsun Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/681,072

(22) Filed: Aug. 18, 2017

(65) Prior Publication Data

US 2019/0057056 A1    Feb. 21, 2019

(51) Int. Cl.
| G06F 13/12 | (2006.01) |
| G06F 13/40 | (2006.01) |
| G06F 13/42 | (2006.01) |
| G06F 3/06  | (2006.01) |
| G06F 11/30 | (2006.01) |

(52) U.S. Cl.
CPC ........ *G06F 13/4022* (2013.01); *G06F 3/0604* (2013.01); *G06F 3/067* (2013.01); *G06F 3/0653* (2013.01); *G06F 11/30* (2013.01); *G06F 13/4282* (2013.01); *G06F 13/12* (2013.01); *G06F 2213/0028* (2013.01)

(58) Field of Classification Search
None
See application file for complete search history.

(56) References Cited

U.S. PATENT DOCUMENTS

| 8,184,933 B1* | 5/2012 | Aybay ................. | G02B 6/3895 385/100 |
| 2007/0234113 A1* | 10/2007 | Komatsu .............. | G06F 11/201 714/6.13 |
| 2009/0077478 A1 | 3/2009 | Gillingham et al. | |
| 2009/0222733 A1* | 9/2009 | Basham ............... | G06F 3/0605 715/736 |

(Continued)

FOREIGN PATENT DOCUMENTS

| CN | 101326471 A | 12/2008 |
| TW | 201333964 A | 8/2013 |

(Continued)

OTHER PUBLICATIONS

Extended European Search Report for EP Application No. 17209889.9, dated Jul. 2, 2018.

*Primary Examiner* — Elias Mamo
(74) *Attorney, Agent, or Firm* — Nixon Peabody LLP; Zhou Lu

(57) ABSTRACT

A network system is directed to the locating and verifying data cable routing. The network system includes a data storage server with a switch device, and processing nodes, where each of processing node includes a baseboard management controller (BMC) and a host bus adapter (HBA). The network system also includes a data cable electrically connected to the switch device of the data storage server and the HBA of the processing node. A cable identifier is stored in the BMC of the processing node and the data storage server. The data storage server and each of the processing nodes are managed by a data resource manager configured to read the cable identifier stored in the BMC of the processing node and the data storage server.

11 Claims, 2 Drawing Sheets

(56) References Cited

U.S. PATENT DOCUMENTS

| | | | |
|---|---|---|---|
| 2014/0143453 A1* | 5/2014 | Myrah | G06F 3/00 |
| | | | 710/19 |
| 2014/0173156 A1* | 6/2014 | Alshinnawi | G06F 13/36 |
| | | | 710/305 |
| 2015/0120969 A1 | 4/2015 | He et al. | |
| 2017/0083472 A1 | 3/2017 | Su et al. | |
| 2017/0168730 A1 | 6/2017 | Chiu et al. | |
| 2018/0081849 A1* | 3/2018 | Remis | G06F 13/4282 |

FOREIGN PATENT DOCUMENTS

| | | |
|---|---|---|
| TW | 201606774 A | 2/2016 |
| TW | 201721423 A | 6/2017 |

\* cited by examiner

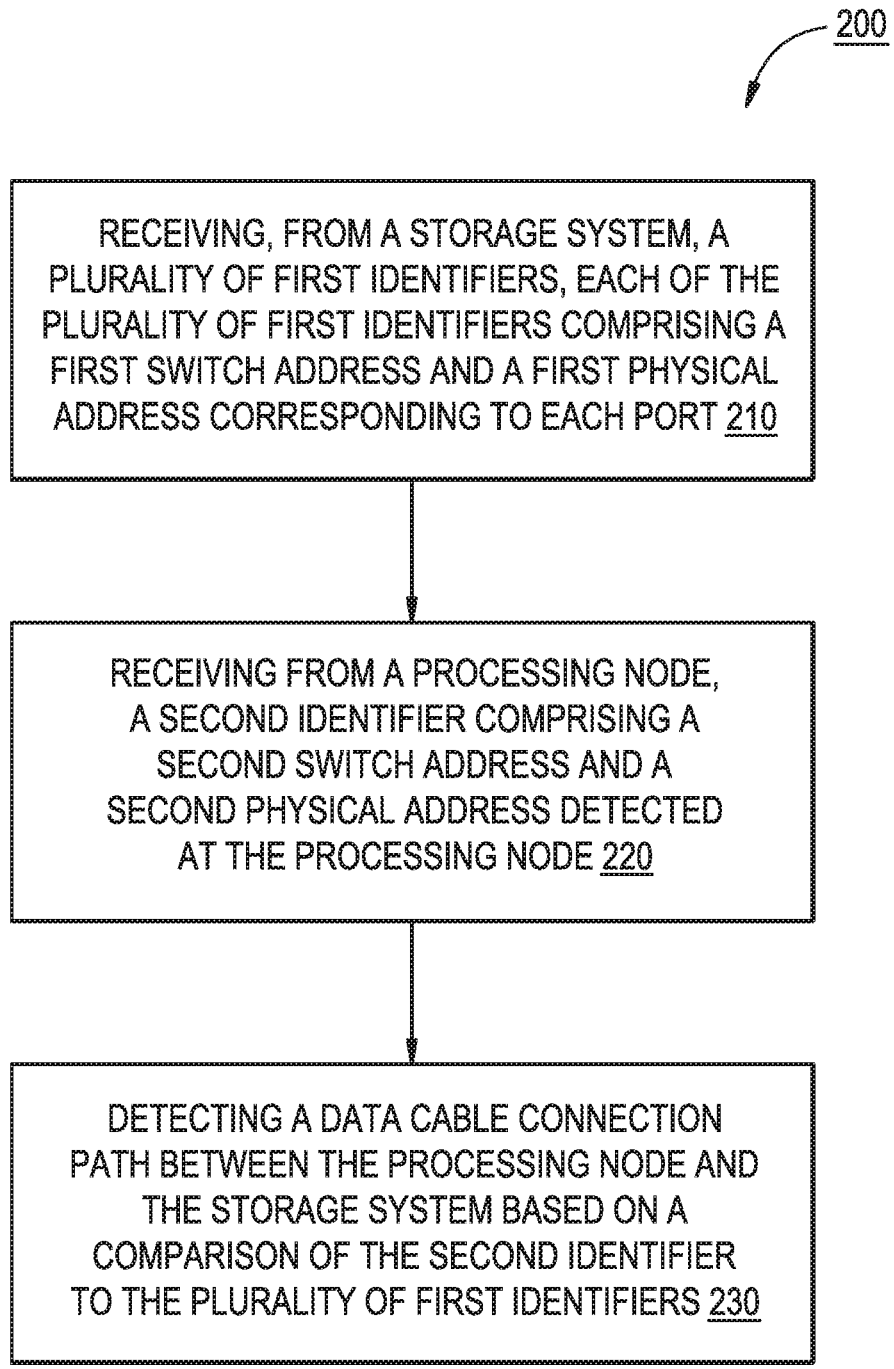

METHOD TO LOCATE SAS JBOD CABLE ROUTING

FIELD OF THE INVENTION

The present invention relates generally to locating and verifying data cable routing within a network system.

BACKGROUND

Typical modern data centers contain a plurality of heterogeneous types of data storage equipment. Frequently, an array of data storage devices configured along with various printed circuit boards are packaged within an enclosure. The enclosure is a data storage array such as a box commonly referred to as Just a Bunch of Disks (JBOD) or a data storage server. Frequently JBOD boxes or data storage servers contain printed circuit boards configured as port expanders and a plurality of data storage devices. Port expanders are switches configured to switch several sets of communication signals from one data storage device to another. Data storage servers typically include one or more computer engines performing server functionality where JBOD enclosures typically communicate with a server that is external to the JBOD enclosure. Thus both data storage servers and JBOD enclosures each typically use a plurality of cables connecting data storage devices or data storage subassemblies to other printed circuit boards contained within an enclosure.

The most common data storage device communication signals used in the data center today are low voltage differential signals configured in a plurality of pairs. Standard data storage device communication interfaces include serial attached SCSI (SAS) and serial attached ATA (SATA).

Both SAS and SATA communication interfaces contain two pairs of electrical conductors. One pair of these conductors is configured to transmit commands and data to a data storage device and the second pair of conductors are configured to receive data or other information from that same data storage device. Each set of two pairs of electrical conductors is commonly referred to as a data communication lane. The electrical conductors for each lane are commonly referred to as transmit X (TrX), transmit Y (TrY), read X (RdX), and read Y (RdY).

Frequently, data storage arrays have several circuit boards and a plurality of cables interconnecting those circuit boards. Typically, there are circuit boards that connect to devices external and remote to the data storage array, there are circuit boards containing port expander circuits, and there are circuit boards configured to fan out (spread out) data storage device communication interconnections to a plurality of individual data storage devices.

Thus, data storage arrays contain many circuit boards with a plurality of cables connecting the different circuit boards electrically to each other and to a plurality of data storage devices. This means that the typical data storage array contains many connectors to which the cables connect. Moreover, the typical data storage can contain remote components connected via the many connectors. Often times, many of these connectors are difficult to locate and the connections between components, particularly remote components, can be difficult to verify. Maintaining these various connections in the absence of human error is often quite challenging.

SUMMARY

Embodiments of the invention concern a network system and a computer-implemented method for locating data cable connections within a network system for a data cable connected to a data storage server and to a processing node. A network system according to the various embodiments can include a data storage server with a switch device. In some exemplary embodiments, the network system can include a plurality of processing nodes. Each of the processing nodes can include a baseboard management controller (BMC) and a host bus adapter (HBA). In some embodiments, the network system can include a data cable electrically connected to the switch device of the data storage server and the HBA of the processing node. In some embodiments of the disclosure, a cable identifier is stored in the BMC of the processing node and the data storage server. In some embodiments of the disclosure, the data storage server and the processing node are managed by a data resource manager. The data resource manager can be configured to read and verify the cable identifier stored in the BMC of the processing node and the data storage server.

In some exemplary embodiments, the data storage server comprises a serial attached SCSI (SAS) Just a Bunch of Disks (JBOD). Furthermore, the switch device comprises a SAS switch. In some exemplary embodiments, the cable identifier includes an address of the switch device and a port Physical Layer (PHY) identifier. In some embodiments, the BMC is configured to scan the data storage server via the HBA to retrieve the address of the switch device and the port Physical Layer (PHY) identifier to store the cable identifier. In some embodiments, the data resource manager is configured to read the cable identifier stored in the BMC via an out-of-band access network. Furthermore, the data resource manager can be configured to read the cable identifier stored in the data storage device communication interface on the data storage server via a network interface controller (NIC) interface.

An exemplary computer-implemented method can be provided for mapping data cable connections within a network system for a data cable connected to a data storage server and to a processing node. In some embodiments, a plurality of first identifiers can be received from the data storage server. Each of the plurality of first identifiers can be configured to correspond to each port of a switch of the data storage server for remotely accessing disparate storage resources of the data storage server. Furthermore, each of the plurality of first identifiers can include a first switch address and a first physical address corresponding to each port. Furthermore, a second identifier can be received from the processing node. The second identifier can include a second switch address and a second physical address detected at the processing node. Furthermore, a data cable connection path between the processing node and the data storage server can be detected based on a comparison of the second identifier to the plurality of first identifiers.

In some exemplary embodiments, the data storage server can include a serial attached SCSI (SAS) Just a Bunch of Disks (JBOD). Receiving the plurality of first identifiers from the data storage server can include receiving the plurality of first identifiers via an out-of-band access network. Furthermore, receiving a second identifier from the processing node can include receiving the second identifier via a network interface controller (NIC) interface.

BRIEF DESCRIPTION OF THE DRAWINGS

FIG. 2 is a flow diagram exemplifying the process of the management system for mapping data cable connections within a network system for a data cable connected to a data storage server and to a processing node in accordance to an embodiment of the disclosure.

DETAILED DESCRIPTION

Figure 1:
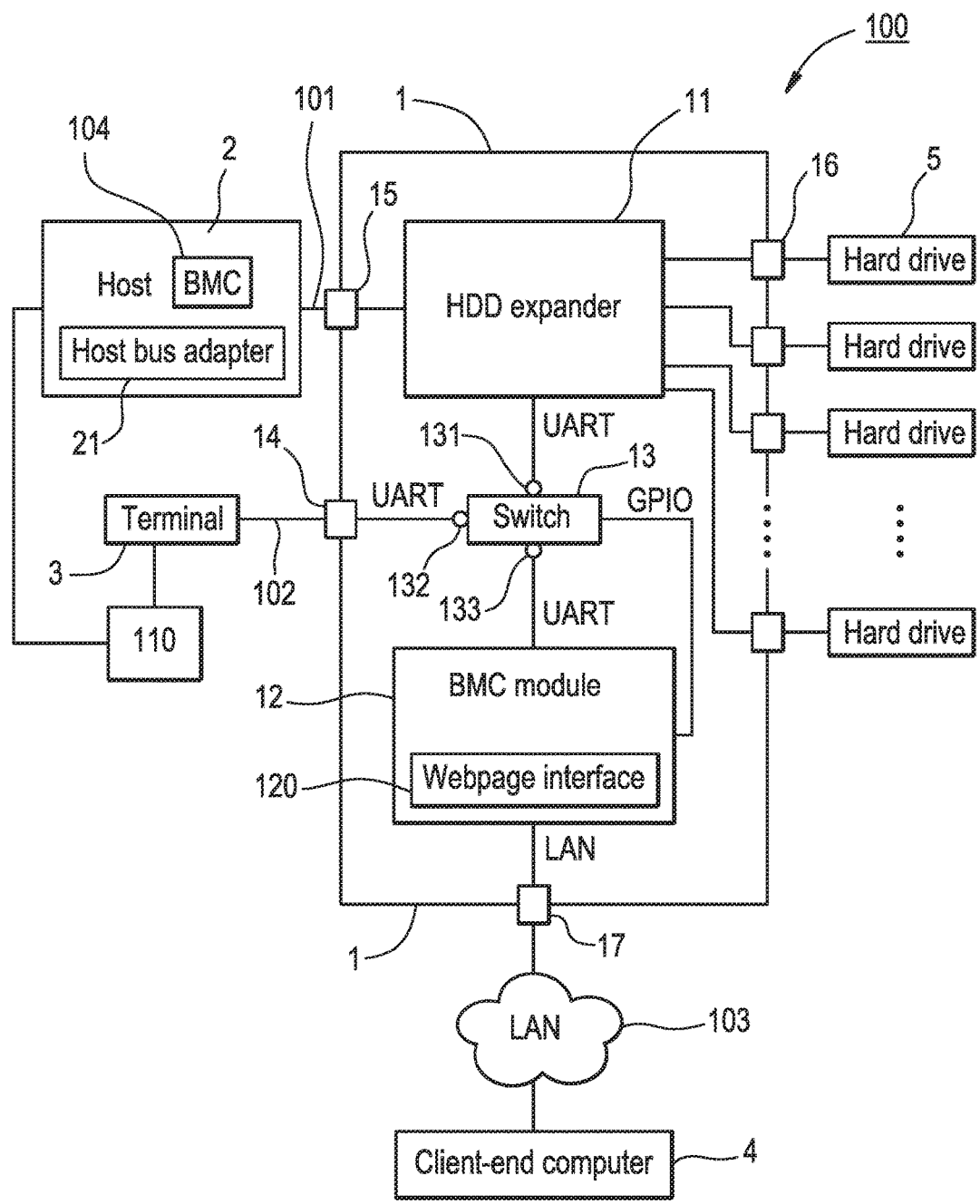
FIG. 1 is a detailed schematic block diagram of a network system in accordance with some embodiments of the disclosure.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Disclosed herein is an exemplary network system and corresponding method directed towards locating a SAS JBOD cable. In this configuration, the cumbersome process of manually reading an ID number in an electrically erasable and programmable read only memory ("EEPROM") of the SAS cable is avoided. In the disclosed embodiments, a user is remotely enabled to locate which SAS JBOD is connected and verify if the SAS cable is connected to a remote JBOD system. In addition, a user can use a normal SAS cable, with or without EEPROM, to connect to a remote SAS JBOD system. As a result, the disclosed embodiments provide the SAS JBOD cable routing information to a management system to verify if the JBOD cable route is connected to host systems as expected.

Referring to FIG. 1, which is a network system 100 in accordance with an exemplary embodiment of the present disclosure. The network system 100 can include a just a bunch of disks (JBOD) apparatus 1 having a baseboard management controller (BMC) module 104, a host 2, a terminal 3, and a client end computer 4. The JBOD apparatus 1 connects a plurality of hard drives 5 respectively and independently. In some embodiments of the disclosure, the JBOD apparatus 1 is configured to adopt serial attached SCSI (SAS). It should be understood the configuration of the network system 100 is simplified to components listed herein, but is not limited thereto.

The JBOD apparatus can be configured to connect to a host 2 through a cable 101 which is able to support the SAS format. In some embodiments, cable 101 can be an SAS cable. When operating the host 2, a user can access the plurality of hard drives 5 respectively connected to the JBOD apparatus 1 upon the host 2. Therefore, the amount of accessible hard drive of the host 2 will be greatly increased. The JBOD apparatus 1 can also be configured to connect to a terminal 3 through cable 102. The terminal 3 can be operated by a management system 110.

In some embodiments, the management system 110 can be configured to operate the terminal 3 to send commands to the JBOD apparatus 1 for inquiry information of the JBOD apparatus 1. For example, the management system 110 can inquire of the environment temperature inside a case of the JBOD apparatus 1, a status of fans, a status of power, or a status of the plurality of hard drives 5 (for example, inserted, removed, turned on, turned off, failure, etc.).

Furthermore, the management system 110 can detect SAS JBOD cable routing identification information of the cable 101 and verify if the cable 101 route is connected to the host 2, as expected. Specifically, the identification information of the cable 101 can be defined by a SAS switch 13 address in the JBOD apparatus 1 and a physical ID for the SAS port 15 for the cable 101. The identification information can be obtained by the host 2 via the host bus adapter (HBA) 21. Furthermore, the identification information can be obtained in the JBOD apparatus 1 from the SAS switch 13. These two values are then compared to verify the cable 101. This is discussed in greater detail below.

In some embodiments where the terminal 3 is able to support an x-modem communication protocol, the management system 110 can transmit a firmware updating file to the JBOD apparatus 1 through the terminal 3, so as to update a firmware used by a hard disk drive (HDD) expander 11 of the JBOD apparatus 1.

In some embodiments of the disclosure, the JBOD apparatus 1 can be configured with a BMC module 12. The JBOD apparatus 1 can connect to a network 103 through the BMC module 12. This network 103 can be a local or network (LAN), a wide area network (WAN), virtual private network (VPN) utilizing communication links over the internet, for example, or a combination of LAN, WAN and VPN implementations can be established. For the purposes of this description, the term network should taken broadly to include any acceptable network architecture. For example, the JBOD apparatus 1 can connect to an Ethernet through the BMC module 12. The JBOD apparatus 1 can connect to a remote client-end computer 4 through the Ethernet. Therefore, the JBOD apparatus 1 can receive operations from a local user through the host 2 or from a local manager through the terminal 3. Further, the JBOD apparatus 1 can be configured to connect with the remote client-end computer 4 through the Ethernet and execute operations according to the Ethernet transmitted commands from other users. In some embodiments, a user can connect to the host 2 through the network 103, and control the JBOD apparatus 1 remotely through the host 2.

The JBOD apparatus 1 can include an HDD expander 11, a BMC module 12 and a switch 13. In particular, the JBOD apparatus 1 can include a first connecting port 14, a second connecting port 15, a plurality of third connecting ports 16 and a network port 17.

In some embodiments of the disclosure, the HDD expander 11 can be connected to the plurality of third connecting ports 16 through several cables, so as to connect to the plurality of hard drives 5 through the plurality of third connecting ports 16. Alternatively, the HDD expander 11 can be connected to the plurality of third connecting ports 16 through several cables, so as to serial connect to other JBOD apparatuses (not shown) through the plurality of third connecting ports 16. In this embodiment, the HDD expander 11 can be configured to detect and verify information of the JBOD apparatus 1. For example, the HDD expander 11 can be configured to detect an environment temperature inside the case of the JBOD apparatus 1, status of the fans, status of power, insertion status or power status of the plurality of hard drives 5, etc. Thus, the HDD expander 11 can be configured to generate corresponding apparatus data. In this embodiment, the plurality of third connecting ports 16 comprises serial advanced technology attachment (SATA) connecting ports or SAS connecting ports. In some embodiments, the plurality of hard drives 5 can include hard drives configured to support the SATA interface or the SAS interface, but not limited thereto.

The HDD expander 11 is also connected to the second connecting port 15, and connected to the host 2 externally through the second connecting port 15. Specifically, the host 2 can include a host bus adapter (HBA) 21 and a BMC module 104. In some exemplary embodiments, the second connecting port 15 is an SAS connecting port. Further, the management system 110 can be configured to connect the HBA 21 to the second connecting port 15 through cable 101. In some embodiments, cable 101 can be configured to support the SAS format, so as to connect the host 2 to the JBOD apparatus 1 (i.e., connects the host 2 to the HDD expander 11).

The host 2 in this embodiment can transmit commands to the JBOD apparatus 1 through the HBA 21, so as to request necessary information from the JBOD apparatus 1. Moreover, the host 2 can access data stored in the plurality of hard drives 5 respectively through programs installed in the HBA 21. Furthermore, if the host 2 is connected to the network (LAN for example), then the host 2 can receive a remote command through the network, and execute corresponding operations to the JBOD apparatus 1 according to the remote command. For example, requesting the apparatus data from the JBOD apparatus 1, controlling the JBOD apparatus 1 or each of the plurality of hard drives 5 to turn on or to turn off, etc.

In some embodiments, the cable 101 can have associated identification information. This associated identification information can be stored within the BMC module 12 of the JBOD apparatus 1. In some embodiments of the present disclosure, the identification information can include SAS cable ID. Furthermore, in some embodiments of the present disclosure, the identification information can include the SAS switch address of the switch 13. In some embodiments, the identification information can include SAS connecting port identification for the second connecting port 15. The identification information can be stored within the BMC module 12 of the JBOD apparatus 1 via the switch 13.

Furthermore, the cable 101 identification information can be stored within the BMC module 104 of the host 2. For example, the BMC 104 can scan the SAS topology of the JBOD apparatus 1 using the HBA 21 to receive the address of the switch 13. Moreover, the BMC 104 can scan the SAS topology of the JBOD apparatus 1 using the HBA 21 to receive the connecting port identification for the second connecting port 15. Once retrieved, the identification information can be stored within the BMC module 12 of the JBOD apparatus 1.

The management system 110 can identify the cable 101 based on the separately stored identification information. For example, the management system 110 can request the cable 101 identification information from the BMC module 104 of the host 2. Furthermore, the management system 110 can request the cable 101 identification information from the BMC module 12 of the JBOD apparatus 1. This is discussed in greater detail below.

The switch 13 is connected to the HDD expander 11, the BMC module 12 and the first connecting port 14. In particular, the switch 13 can connect the HDD expander 11 with the first connecting port 14 to enable a first transmission channel, and can connect the HDD expander 11 with the BMC module 12 to enable a second transmission channel. In this embodiment, the switch 13 is to receive a switching signal, and decides to enable the first transmission channel or the second transmission channel in accordance with the received switching signal. In other words, the first transmission channel and the second transmission channel are not enabled at the same time, i.e., the HDD expander 11 is alternatively connected with the first connecting port 14 or the BMC module 12 at a time.

In particular, the switch 13 in this embodiment comprises a first contact 131, a second contact 132 and a third contact 133, wherein the switch 13 is connected to the HDD expander 11 through the first contact 131, connected to the first connecting port 14 through the second contact 132, and connected to the BMC module 12 through the third contact 133. When choosing to enable the first transmission channel, the switch 13 connects the first contact 131 to the second contact 132. When choosing to enable the second transmission channel, the switch 13 cuts off the connection between the first contact 131 and the second contact 132, and changes to connect the first contact 131 to the third contact 133. However, the above description is just a specific embodiment, not intended to limit the scope of the present invention.

The first connecting port 14 is used to connect with the terminal 3 externally, so as to receive the commands sent from the terminal 3. If the first transmission channel is enabled, the HDD expander 11 can receive the command sent from the terminal 3 through the first connecting port 14, and executes corresponding actions based on the received command, and replies to the terminal 3 with related information.

The BMC module 12 is connected to the network port 17, and connected to the network 103 through the network port 17. In this embodiment, the default setting of the switch 13 is to enable the first transmission channel. When the BMC module 12 receives a control command sent from a remote place through the Ethernet, it generates and sends the switching signal to the switch 13, and controls the switch 13 to change to enable the second transmission channel. Therefore, the BMC module 12 can connect with the HDD expander 11 through the enabled second transmission channel, and executes an interactive operation with the HDD expander 11 in accordance with the control command transmitted through the network 103. In this embodiment, the network port 17 comprises a local area network (LAN) port, but not limited thereto.

As shown in FIG. 1, the BMC module 12 in this embodiment is further connected to the switch 13 through a general purpose I/O (GPIO) interface, and transmits the switching signal to the switch 13 through the GPIO interface, so as to control the switch 13 to enable the first transmission channel or the second transmission channel.

In this embodiment, the HDD expander 11 is able to support signal in a universal asynchronous receiver/transmitter (UART) format, and the HDD expander 11 communicates with the BMC module 12 and the first connecting port 14 (i.e., the terminal 3 connected to the first connecting port 14) through transmitting the UART format signal. Moreover, the BMC module 12 in this embodiment receives the control command in a LAN format through the network 103, and transmits the control command to the HDD expander 11 after transforming the control command into the UART format. As shown in FIG. 1, the BMC module 12 comprises a webpage interface 120. In this embodiment, the BMC module 12 receives a remote connection from the client-end computer 4 through the webpage interface 120. Therefore, the BMC module 12 can receive the control command remotely sent from the client-end computer 4 through the webpage interface 120. More specifically, after the BMC module 12 boots, it runs the webpage interface 120 automatically, wherein the webpage interface 120 uses an IP address assigned to the BMC module 12.

The management system 110 can access the BMC module 12 via the webpage interface 120. In an exemplary embodiment, the management system 110 can request the cable 101 identification information from the BMC module 12 of the JBOD apparatus 1. Once received, the management system 110 can compare the cable 101 identification information stored in the BMC module 12 of the JBOD apparatus 1 to the cable 101 identification information stored in the BMC module 104 of the host 2. Once compared, the management system 110 can verify the SAS cable 101 is linked-up between the host 2 and the JBOD apparatus 1. In this way, the cumbersome process of manually reading an ID number in an electrically erasable and programmable read only memory ("EEPROM") of the SAS cable is avoided. Furthermore, a user is enabled to locate which SAS JBOD is connected and verify if the SAS cable is connected to a remote JBOD system. A normal SAS cable can be employed, with or without EEPROM, to connect to a remote SAS JBOD system. As a result, the disclosed embodiments reduce human error while JBOD is setup.

A flow chart for carrying out the method 200 in accordance with the exemplary management system 110 is shown in FIG. 2. As detailed above, the present embodiment provides a method for mapping data cable connections within a network system for a data cable connected to a data storage server (JBOD apparatus 1) and to a processing node (host 2). As an initial matter, a cable identifier can be assigned by the BMC 104 at the processing node (host 2). Specifically, identification information of the cable 101 can be defined by a SAS switch 13 address in the JBOD apparatus 1 and a physical ID for the SAS port 15 for the cable 101. The identification information can be obtained by the host 2 via the HBA 21. Furthermore, the identification information can be obtained in the JBOD apparatus 1 from the SAS switch 13. The BMC 104 can assign the cable identifier based on a scan via the HBA 21 of the physical ID for the SAS port 15 and the SAS switch 13 address.

At step 210, a plurality of first identifiers can be received from the JBOD apparatus 1. In some embodiments of the disclosure, each of the first identifiers can correspond to each port of a switch of the JBOD apparatus 1 for remotely accessing the storage resources of the JBOD apparatus 1. Furthermore, each of the first identifiers can include a first switch address and a first physical address corresponding to each port.

At step 220, a second identifier can be received from the host 2. In some embodiments, the second identifier can include a second switch address and a second physical address detected at the host 2. The management system 110 can access the BMC module 12 via the webpage interface 120. In an exemplary embodiment, the management system 110 can request the cable 101 identification information from the BMC module 12 of the JBOD apparatus 1.

At step 230, the management system 110 can be configured to detect a data cable connection path between the host 2 and the JBOD apparatus 1 based on a comparison of the second identifier to the plurality of first identifiers.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A network system, comprising:
   a data storage server, comprising a switch device;
   a plurality of processing nodes, wherein each of the processing nodes comprises a baseboard management controller (BMC) and a host bus adapter (HBA); and
   a data cable electrically connected to the switch device of the data storage server and the HBA of the processing node, wherein a cable identifier is stored in the BMC of the processing node and the data storage server,
   wherein the switch device is connected to a hard drive (HDD) expander via a first transmission channel, and the switch device is connected to the BMC via a second transmission channel,
   wherein either the first transmission channel or the second transmission channel is enabled, but not both,
   wherein the data storage server and each of the processing nodes are managed by a data resource manager configured to read the cable identifier stored in the BMC of the processing node and the data storage server.

2. The network system of claim 1, wherein the data storage server comprises a serial attached SCSI (SAS) Just a Bunch of Disks (JBOD).

3. The network system of claim 2, wherein the switch device comprises an SAS switch.

4. The network system of claim 1, wherein the cable identifier comprises:
   an address of the switch device; and
   a port Physical Layer (PHY) identifier.

5. The network system of claim 4, wherein the BMC is configured to scan the data storage server via the HBA to retrieve the address of the switch device and the port Physical Layer (PHY) identifier to store the cable identifier.

6. The network system of claim 1, wherein the data resource manager is configured to read the cable identifier stored in the BMC via an out-of-band access network.

7. The network system of claim 1, wherein the data resource manager is configured to read the cable identifier stored in the data storage device communication interface on the data storage server via a network interface controller (NIC) interface.

8. A computer-implemented method for mapping data cable connections within a network system for a data cable connected to a data storage server and to a processing node, comprising:
   receiving, from the data storage server, a plurality of first identifiers, each of the plurality of first identifiers corresponding to each port of a switch of the data storage server for remotely accessing disparate storage resources of the data storage server, each of the plurality of first identifiers comprising a first switch address and a first physical address corresponding to each port;
   receiving from the processing node, a second identifier comprising a second switch address and a second physical address detected at the processing node, wherein the processing node comprises a baseboard management controller (BMC) and a host bus adapter (HBA); and
   detecting a data cable connection path between the processing node and the data storage server based on a comparison of the second identifier to the plurality of first identifiers,
   wherein the switch is connected to a hard drive (HDD) expander via a first transmission channel, and the switch is connected to the BMC via a second transmission channel,
   wherein either the first transmission channel or the second transmission channel is enabled, but not both.

9. The computer-implemented method of claim 8, wherein the data storage server comprises a serial attached SCSI (SAS) Just a Bunch of Disks (JBOD).

10. The computer-implemented method of claim 8, wherein receiving, from the data storage server, the plurality of first identifiers comprises receiving, from the data storage server, the plurality of first identifiers via an out-of-band access network.

11. The computer-implemented method of claim 8, wherein receiving from the processing node, a second identifier comprises receiving the second identifier via a network interface controller (NIC) interface.

* * * * *